United States Patent
Pantazi et al.

(10) Patent No.: US 11,195,085 B2
(45) Date of Patent: Dec. 7, 2021

(54) SPIKING SYNAPTIC ELEMENTS FOR SPIKING NEURAL NETWORKS

(71) Applicant: International Business Machines Corporation, Armonk, NY (US)

(72) Inventors: Angeliki Pantazi, Thalwil (CH); Stanislaw Andrzej Wozniak, Kilchberg (CH); Stefan Abel, Zürich (CH); Jean Fompeyrine, Waedenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 489 days.

(21) Appl. No.: 16/360,158

(22) Filed: Mar. 21, 2019

(65) Prior Publication Data
US 2020/0302267 A1   Sep. 24, 2020

(51) Int. Cl.
*G06N 3/04*   (2006.01)
*G06N 3/08*   (2006.01)
(Continued)

(52) U.S. Cl.
CPC ............. *G06N 3/049* (2013.01); *G06N 3/063* (2013.01); *G06N 3/084* (2013.01)

(58) Field of Classification Search
CPC ......... G06N 3/049; G06N 3/063; G06N 3/084
See application file for complete search history.

(56) References Cited

U.S. PATENT DOCUMENTS

2013/0103626 A1*   4/2013   Hunzinger ............. G06N 3/049
                                                              706/16
2014/0143190 A1    5/2014   Padovani et al.
(Continued)

FOREIGN PATENT DOCUMENTS

CN      106845632 A      6/2017
WO      2013184688 A1   12/2013

OTHER PUBLICATIONS

Gardner et al., "Classifying Patterns in a Spiking Neural Network," ESANN 2014 Proceedings, Computational Intelligence and Machine Learning, 2014, pp. 23-28.
(Continued)

*Primary Examiner* — Paulinho E Smith
(74) *Attorney, Agent, or Firm* — Cantor Colburn LLP; Daniel Morris

(57) ABSTRACT

Embodiment of the invention are directed to transmitting signals between neurons of a hardware-implemented, spiking neural network (or SNN). The network includes neuronal connections, each including a synaptic unit connecting a pre-synaptic neuron to a post-synaptic neuron. Spikes received from the pre-synaptic neuron of said each neuronal connection are first modulated, in frequency, based on a synaptic weight stored on said each synaptic unit, to generate post-synaptic spikes, such that a first number of spikes received from the pre-synaptic neuron are translated into a second number of post-synaptic spikes. At least some of the spikes received from the pre-synaptic neuron may, each, be translated into a train of two or more post-synaptic spikes. The post-synaptic spikes generated are subsequently transmitted to the post-synaptic neuron of said each neuronal connection. The novel approach makes it possible to obtain a higher dynamic range in the synapse output.

24 Claims, 8 Drawing Sheets

(51) Int. Cl.
*G06N 3/06* (2006.01)
*G06N 3/063* (2006.01)

(56) References Cited

U.S. PATENT DOCUMENTS

| | | | |
|---|---|---|---|
| 2014/0188771 | A1 | 7/2014 | Modha et al. |
| 2014/0310216 | A1* | 10/2014 | Sarah .................. G06N 3/049 706/15 |
| 2015/0094852 | A1* | 4/2015 | Laurent .................. G05D 1/00 700/250 |
| 2018/0082177 | A1 | 3/2018 | Boybat et al. |
| 2018/0197074 | A1 | 7/2018 | Friedman et al. |
| 2020/0302267 | A1* | 9/2020 | Pantazi .................. G06N 3/049 |
| 2020/0401876 | A1* | 12/2020 | Chakrabartty ......... G06N 3/049 |
| 2021/0138249 | A1* | 5/2021 | Howard ............. A61N 1/36071 |

OTHER PUBLICATIONS

International Search Report and Written Opinion dated Jun. 11, 2020 in PCT/IB2020/051669 (8 pages).

Al-Shedivat et al., "Memristors Empower Spiking Neurons With Stochasticity," IEEE Journal on Emerging and Selected Topics in Circuits and Systems 5.2, 2015, pp. 242-253.

Földiak, "Forming sparse representations by local anti-Hebbian learning," Biological Cybernetics 64.2, 1990, pp. 165-170.

Indiveri, "Synaptic Plasticity and Spike-based Computation in VLSI Networks of Integrate-and-Fire Neurons," Neural Inf. Process. Lett. Rev 11, 2007, pp. 135-146.

Kuzum et al., "Synaptic electronics: materials, devices and applications," Nanotechnology 24.38, 2013, 382001, 23 pages.

Mitra et al., "Spike-based synaptic plasticity and classification on VLSI," The Neuromorphic Engineer a Publication of INE-WEB. org, 10.1200904.1636, 2009, 3 pages.

Modha et al., "Cognitive Computing," Communications of the ACM 54.8, 2011, pp. 62-71.

Pantazi et al., "All-memristive neuromorphic computing with level-tuned neurons," Nanotechnology 27.35, 2016, 355205, 14 pages.

Querlioz et al., "Simulation of a Memristor-Based Spiking Neural Network Immune to Device Variations," The 2011 International Joint Conference on Neural Networks, IEEE, 2011, 7 pages.

Woźniak et al., "Learning Spatio-Temporal Patterns in the Presence of Input Noise using Phase-Change Memristors," 2016 IEEE International Symposium on Circuits and Systems (ISCAS), IEEE, 2016, pp. 365-368.

* cited by examiner

SPIKING SYNAPTIC ELEMENTS FOR SPIKING NEURAL NETWORKS

BACKGROUND

The invention relates in general to techniques for transmitting signals between neurons of a hardware-implemented, spiking neural network. In particular, it is directed to methods for transmitting signals between neurons of a spiking neural network, wherein spikes received from pre-synaptic neurons are modulated in frequency to generate post-synaptic spike trains (rather than being converted to currents of varying amplitudes), prior to transmitting the latter to post-synaptic neurons.

Machine learning often relies on artificial neural networks (ANNs), which are computational models inspired by biological neural networks in human or animal brains. Such systems progressively and autonomously learn tasks by means of examples; they have successfully been applied to, e.g., speech recognition, text processing and computer vision.

An ANN comprises a set of connected units or nodes, which compare to biological neurons in animal brains and are therefore called artificial neurons. Signals are transmitted along connections (also called edges) between artificial neurons, similarly to synapses. That is, an artificial neuron that receives a signal processes it and then signals connected neurons. Typically, the signals conveyed along such connections are analog real numbers and outputs of the artificial neurons are computed thanks to a non-linear function of the sum of its inputs.

Connection weights (also called synaptic weights) are associated with the connections and nodes; such weights adjust as learning proceeds. Each neuron may have several inputs and a connection weight is attributed to each input (the weight of that specific connection). Such connection weights are learned during a training phase and thereby updated. The learning process is iterative: data cases are presented to the network, typically one at a time, and the weights associated with the input values are adjusted at each time step.

Many types of neural networks are known, starting with feedforward neural networks, such as multilayer perceptrons, deep neural networks and convolutional neural networks. Besides, new types of neural networks emerge, such as spiking neural networks. A spiking neural network (SNN) substantially differs from usual neural networks, inasmuch as SNNs operate using spikes, which are discrete binary events that can occur asynchronously at any point in time, rather than analog values computed at regular time-steps. That is, in addition to neuronal and synaptic state, SNNs further incorporate the concept of time. I.e., neurons fire only when a membrane potential reaches a specific value, rather than firing at each propagation cycle as in, e.g., multilayer perceptron networks. Firing means, in the context of SNNs, that a neuron generates a signal that reaches other neurons, which, in turn, increase or decrease their potentials according to the signals they receive from other neurons.

Neural networks are typically implemented in software. However, a neural network may also be implemented in hardware, e.g., as a resistive processing unit or an optical neuromorphic system. I.e., a hardware-implemented ANN is a physical machine that clearly differs from a classic computer (general- or specific-purpose computer) in that it is primarily and specifically designed to implement an ANN (for training and/or inference purposes). A hardware-implemented ANN could, at best, be emulated with a classic computer (though not with the same efficiency), while it cannot perform multiple data-processing tasks as a classic computer does.

SUMMARY

According to a first aspect, the present invention is embodied as a method for transmitting signals between neurons of a hardware-implemented, spiking neural network (or SNN). The network comprises neuronal connections, each including a synaptic unit connecting a pre-synaptic neuron to a post-synaptic neuron. Basically, the method relies on digital modulation process, which is implemented for each neuronal connection of said neuronal connections and at each synaptic unit thereof. Namely, spikes received from the pre-synaptic neuron of said each neuronal connection are first modulated, in frequency, based on a synaptic weight stored on said each synaptic unit, to generate post-synaptic spikes. This way, a first number of spikes received from the pre-synaptic neuron are translated into a second number of post-synaptic spikes. The post-synaptic spikes generated are subsequently transmitted to the post-synaptic neuron of said each neuronal connection. The post-synaptic spikes generated may possibly all have a same signal amplitude.

The present approach makes it possible to obtain a higher dynamic range in the synapse output, thanks to the fact that the discrete events generated at the synaptic unit can be more discernibly read and integrated at each output neuron, compared to analog signals as used in prior art solutions, where input spikes from a pre-synaptic neuron translates into analog currents at the synapse output.

The above process account for operations performed at the synaptic unit, consistently with another aspect of the invention, which concerns a synaptic unit circuit. In embodiments, however, the above process is complemented by additional steps, such as performed by the pre- and post-synaptic neurons. In particular, this process leads to generate, at the post-synaptic neuron of said each neuronal connection, output spikes based on the post-synaptic spikes transmitted. Output spikes can be generated by integrating post-synaptic spikes as received at the post-synaptic neuron, based on a count thereof.

In embodiments of the invention, the method further comprises maintaining (at said each synaptic unit) a state that determines said synaptic weight, wherein said state can be altered according to a cognitive learning mechanism. In particular, the method may further comprise altering (again, at said each synaptic unit) said state according to said cognitive learning mechanism, based, on the one hand, on spikes received from said pre-synaptic neuron and, on the other hand, output spikes generated at one or more post-synaptic neurons of the SNN.

The synaptic unit can be configured to implement a spike-timing-dependent plasticity (STDP) mechanism based on spikes received from said pre-synaptic neuron and output spikes generated at said post-synaptic neuron. I.e., said state is altered based on an STDP mechanism.

Spikes received from the pre-synaptic neuron may notably be modulated, at said each synaptic unit, by first converting the spikes received into one or more electrical signals (according to a synaptic weight determined by said state), and then by setting a frequency of the post-synaptic spikes to be generated, based on said electrical signals.

In embodiments, the present methods involve two states, i.e., a secondary state in addition to the above state (the primary state). That is, the spike modulation process further comprises maintaining a secondary state, which determines a short-term synaptic weight. This secondary state depends on spikes received from the pre-synaptic neuron. The modulation scheme further comprises comparing a current synaptic weight as determined by said primary state to a threshold value. The latter depends on said short-term synaptic weight (as determined from said secondary state), whereby the post-synaptic spikes are generated only if the current synaptic weight is larger than or equal to said threshold value.

In a given class of embodiments, this threshold value is equal to said short-term synaptic weight, whereby the current synaptic weight is compared to said short-term synaptic weight, while said post-synaptic spikes are generated only if the current synaptic weight is larger than or equal to said short-term synaptic weight. The modulation further relies on comparing the short-term synaptic weight to a maximal value allowed for said threshold value and, if said value is accordingly found to be larger than or equal to said maximal value, resetting said short-term synaptic weight.

In another class of embodiments, said threshold value is taken as the difference between a maximal value and said short-term synaptic weight for the purpose of comparing the current synaptic weight to said threshold value. This maximal value is a maximal value allowed for the sum of the current synaptic weight and said short-term synaptic weight. I.e., post-synaptic spikes are generated only if the current synaptic weight is larger than or equal to said difference. Here, the modulation process leads to resetting said short-term synaptic weight every time that a post-synaptic spike is generated for transmission to said post-synaptic neuron (and after having generated this spike).

According to another aspect, the invention is embodied as a synaptic unit circuit for transmitting signals between neurons of a hardware-implemented SNN. The circuit is designed so as to connect a pre-synaptic neuron to a post-synaptic neuron of the network, to thereby form a neuronal connection. Consistently with the present methods, the circuit is configured, when connected to a pre-synaptic neuron and a post-synaptic neuron, to modulate, in frequency, spikes received from the pre-synaptic neuron and transmit the post-synaptic spikes generated to the post-synaptic neuron. Spikes received from the pre-synaptic neuron are modulated based on a synaptic weight stored on the circuit, to generate post-synaptic spikes, whereby a first number of spikes received from the pre-synaptic neuron are translated into a second number of post-synaptic spikes, in operation. As evoked earlier, the circuit may be configured to generate post-synaptic spikes that all have a same amplitude.

In embodiments, the circuit is further configured, when connected to said pre-synaptic neuron and said post-synaptic neuron, to maintain a state that determines said synaptic weight and alter said state based, on the one hand, on spikes received from said pre-synaptic neuron and, on the other hand, on spikes emitted by said post-synaptic neuron.

The circuit can include a spike generation unit designed to generate said post-synaptic spikes and transmit the latter to the post-synaptic neuron, in operation. The circuit further includes a memristive device and an update unit, connectable to each of said pre-synaptic neuron and post-synaptic neuron, and configured to alter said state, in operation. The memristive device is, on the one hand, connected to the spike generation unit and otherwise connectable to said pre-synaptic neuron. The memristive device is otherwise configured to retain said state, so as for the spike generation unit to modulate spikes received by the memristive device from the pre-synaptic neuron based on a synaptic weight as determined from said state, and generate said post-synaptic spikes, in operation. On the other hand, the memristive device is connected to said update unit, whereby any state altered by the update unit determines the synaptic weight used to modulate the spikes, in operation.

In embodiments, said update unit is configured to implement a STDP mechanism based on spikes received from said pre-synaptic neuron and output spikes generated at said post-synaptic neuron, whereby said state is altered based on this STDP mechanism, in operation.

The memristive device can be further configured to convert spikes received from the pre-synaptic neuron into one or more electrical signals (e.g., current or voltage), according to a synaptic weight determined by the state retained in the memristive device, and the spike generation unit is further designed to set a frequency of the post-synaptic spikes to be generated, based on said electrical signals, so as to modulate spikes received from the pre-synaptic neuron, in operation.

In embodiments, said state is a primary state and said memristive device is a first memristive device, configured to retain said primary state. The synaptic unit circuit further comprises a second memristive device, which is connectable to said pre-synaptic neuron and designed to retain a secondary state that determines a short-term synaptic weight, said secondary state depending on spikes received by the second memristive device from the pre-synaptic neuron, in operation.

The synaptic unit circuit can further include a comparator, the latter connected to each of the first memristive device and the second memristive device, so as to compare a current synaptic weight as determined from said primary state to a threshold value, the latter depending on said short-term synaptic weight as determined from said secondary state. Post-synaptic spikes are generated by the spike generation unit only if the current synaptic weight is larger than or equal to said threshold value, in operation.

In embodiments, said comparator is a first comparator, designed to use said short-term synaptic weight as said threshold value, whereby said post-synaptic spikes are generated by the spike generation unit only if the current synaptic weight is larger than or equal to said short-term synaptic weight. In that case, the circuit further includes a second comparator configured to compare said short-term synaptic weight to a maximal value allowed for said threshold value, the circuit being otherwise configured to reset the short-term synaptic weight if the latter is found to be larger than or equal to said maximal value.

The comparator is designed to rely on a difference between a maximal value and said short-term synaptic weight as said threshold value, for comparing the current synaptic weight to said threshold value. This maximal value is a maximal value allowed for the sum of the current synaptic weight and said short-term synaptic weight, whereby said post-synaptic spikes are generated by the spike generation unit only if the current synaptic weight is larger than or equal to said difference, in operation. Also, the circuit is further configured to reset the short-term synaptic weight every time that a post-synaptic spike is generated for transmission to the post-synaptic neuron (after having generated this spike).

According to a final aspect, the invention is embodied as a hardware apparatus implementing a SNN, wherein the network comprises a number of neuronal connections, each including: a pre-synaptic neuron; a post-synaptic neuron; and a synaptic unit circuit such as described above. Said circuit connects the pre-synaptic neuron to the post-synaptic neuron.

A post-synaptic neuron may be connected by a plurality of such circuits. In particular, each post-synaptic neuron of said neuronal connections may notably be connected by a plurality of synaptic unit circuits of the network and configured to generate output spikes based on the post-synaptic spikes transmitted by all the synaptic unit circuits connected thereto.

In embodiments of the invention, said each post-synaptic neuron is further configured to generate said output spikes by integrating the post-synaptic spikes transmitted by the respective synaptic unit circuits, based on a count thereof.

Devices, apparatuses, and methods embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices and components, or parts thereof, as involved in embodiments. Similar or functionally similar elements in the figures have been allocated the same numeral references, unless otherwise indicated.

DETAILED DESCRIPTION

A reliable and efficient hardware implementation of a spiking neural network (SNN) is challenging as continuous signals (values) are typically transmitted by synapses (at outputs thereof) to post-synaptic neurons. As it may be realized, this impacts the dynamic range of signals outputted by a synapse output. This observation, as well as other drawbacks of usual hardware-implemented SNNs, has prompted the present Inventors to develop new techniques for transmitting signals between neurons of a SNN, wherein spikes received from pre-synaptic neurons are modulated in frequency to generate a distinct number of post-synaptic spikes (rather than being converted to currents of varying amplitudes).

Figure 2A:
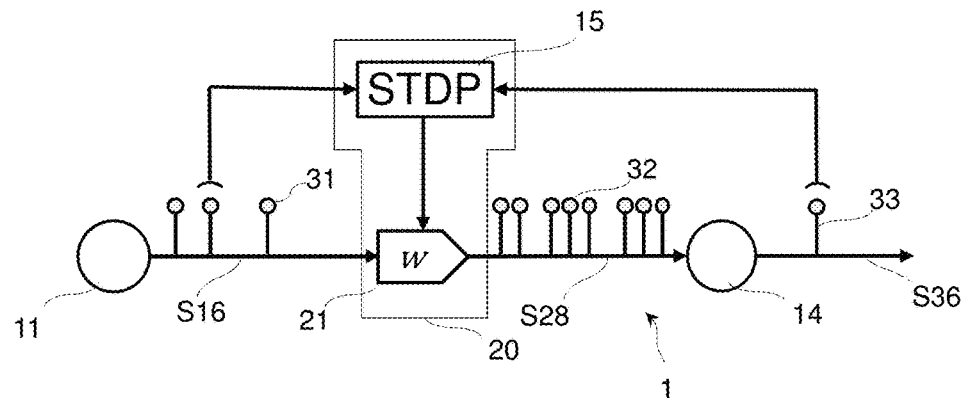
FIGS. 2-7 are diagrams that schematically illustrate the operation of selected components of a hardware-implemented SNN designed for transmitting signals between neurons thereof, wherein spikes received from pre-synaptic neurons are modulated in frequency (rather than in amplitude) to generate post-synaptic spikes, prior to transmitting the latter to post-synaptic neurons, as in embodiments. Note, FIGS. 2 and 7 generally illustrate principles underlying the present approach, while FIGS. 3 to 6 concerns particular classes of embodiments.
Figure 8:
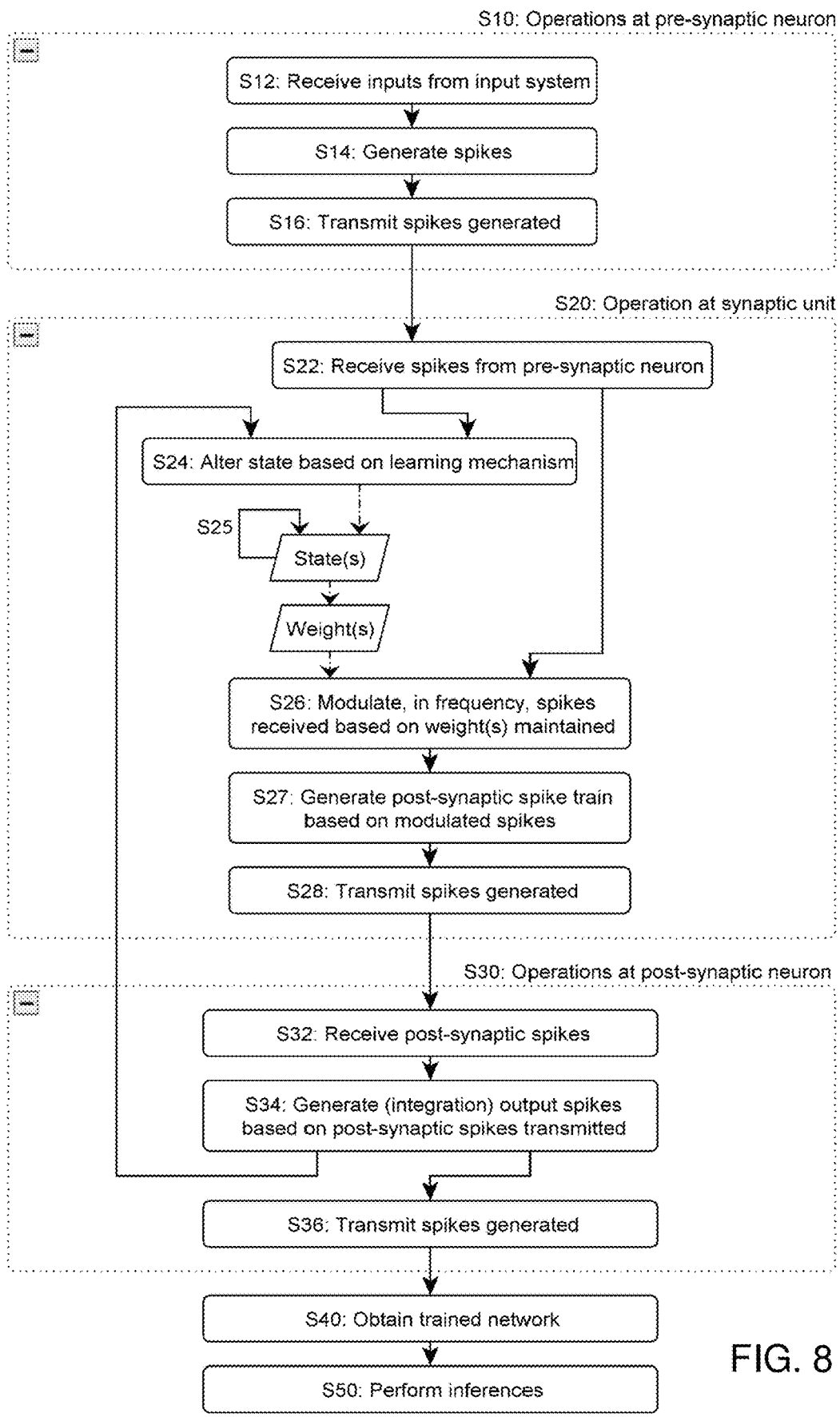
FIG. 8 is a flowchart illustrating high-level steps of a method for transmitting signals between neurons of a hardware-implemented SNN, according to embodiments.

In reference to FIGS. 2 and 8, an aspect of the invention is first described, which concerns a method for transmitting signals between neurons 11, 14 of a hardware-implemented spiking neural network 1, 1a-1c (hereafter SNN). This method and its variants are collectively referred to as "the present methods". The SNN is assumed to comprise several neuronal connections, each including a synaptic unit 20, 20a-20c that connects a pre-synaptic neuron 11 to a post-synaptic neuron 14. This synaptic unit may notably be implemented as a circuit such as described later in reference to another aspect of the invention. The SNN may, as a whole, be implemented as a hardware apparatus, which is also described later in reference to a final aspect of the invention.

This method essentially relies on a modulation process implemented at each synaptic unit of the SNN, i.e., for each of the neuronal connections of the network. According to this process, spikes 31 received S22 from a pre-synaptic neuron 11 are modulated S26 in frequency, as reflected in the flowchart of FIG. 8. The modulation is performed based on the synaptic weight w stored on each synaptic unit 20, 20a-20c, in view of generating S27 post-synaptic spikes 32. Owing to the frequency modulation, the number of spikes received from the pre-synaptic neuron typically translate into a distinct number of post-synaptic spikes. E.g., at least some of the spikes 31 received from the pre-synaptic neuron 11 may, each, be translated into a train of two or more post-synaptic spikes 32, as illustrated in FIGS. 7B and 7C. The post-synaptic spikes 32 generated are subsequently transmitted S28 to the post-synaptic neuron 14 connected by the pre-synaptic neuron 11 via the synaptic unit. The same process is performed along each neuronal connection of the SNN.

Spikes are pulse signals evoking action potentials generated by biological neurons. Similarly, a spike train 32 is a temporal sequence of pulses that can be compared to sequences of action potentials generated by biological neurons.

According to the present approach, a first number of input spikes received from the pre-synaptic neuron 11 are translated into a second number of spikes 32 at the output of the synaptic unit 20. The post-synaptic spikes 32 shall typically all have a same amplitude (be it to simplify the generation process), though this is not a strict requirement. In variants, the emitted, post-synaptic spikes 32 may have distinct amplitudes. Furthermore, the emitted spikes 32 may possibly have the same amplitude as the input spikes, though this is again not a strict requirement.

Figure 1A:
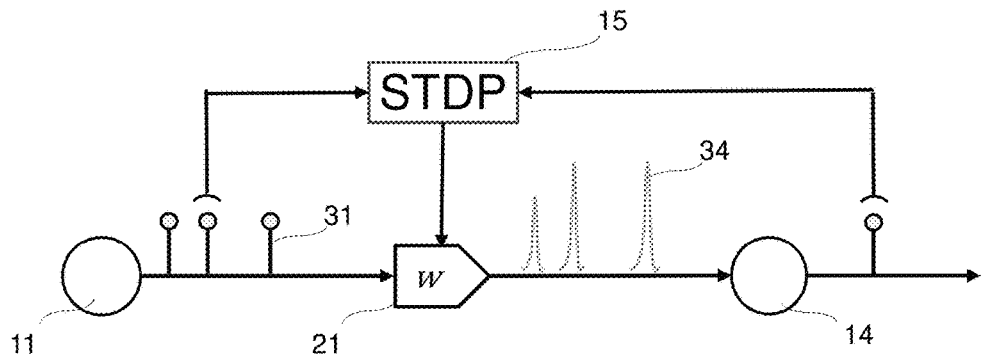
FIGS. 1A and 1B are diagrams that schematically illustrates the operation of selected components of a hardware-implemented, spiking neural network (SNN), where input spikes are converted into post-synaptic currents of varying amplitudes, as in prior art solutions.

The number of spikes emitted by the synaptic unit depends on the synaptic weight w as stored thereon. In other words, here the synaptic weight determines the number of spikes generated S27 and emitted S28, instead of an amplitude of currents emitted by the synaptic unit (compare FIGS. 1 and 2). Interestingly, the present methods are nevertheless compatible with a spike-timing-dependent plasticity (STDP) mechanism. More generally, such methods may involve various learning mechanisms. All such mechanisms result in altering the weights of the neuronal connections as learning proceeds. Once properly trained S40, the SNN can be used S50 for inference purposes. Still, the present networks 1, 1a-1c may possibly be used for inference purposes only, whereby the weights may be set (i.e., programmed), each, to any suitable value as learned from a previous learning phase and remain unaltered therefor. I.e., the synaptic weights might have been learned thanks to a distinct hardware apparatus.

Figure 6:
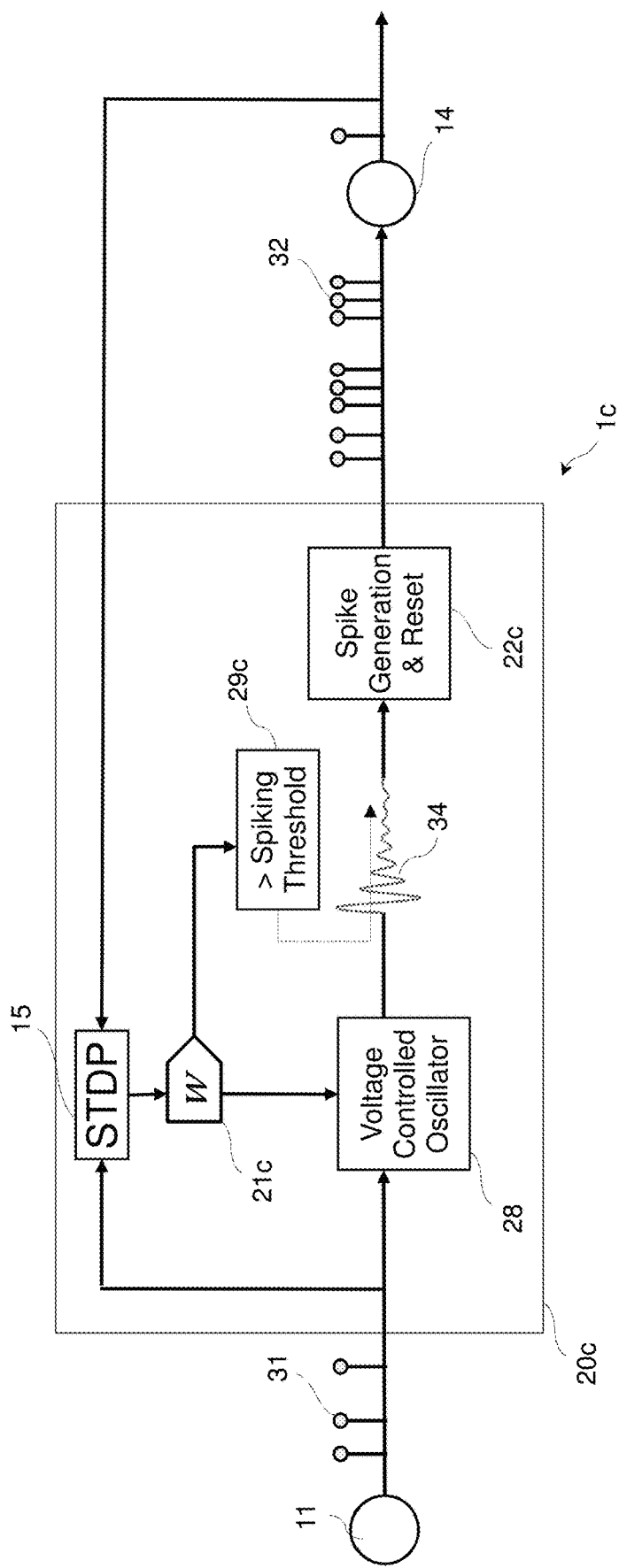
Figure 7A:
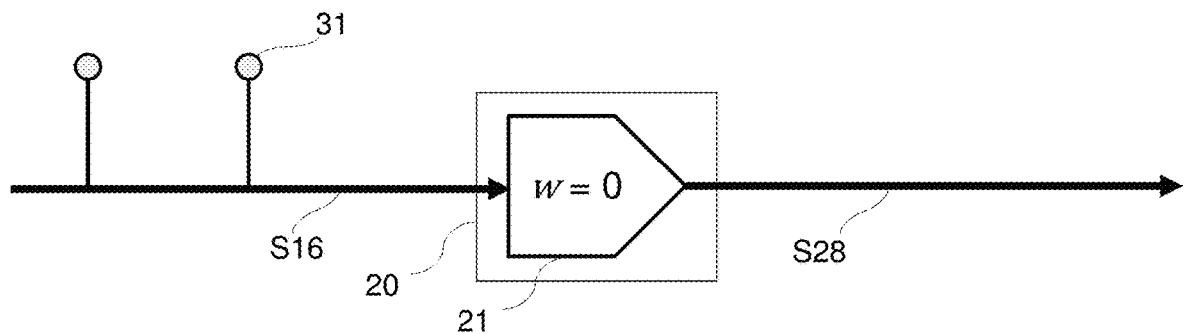
Figure 7B:
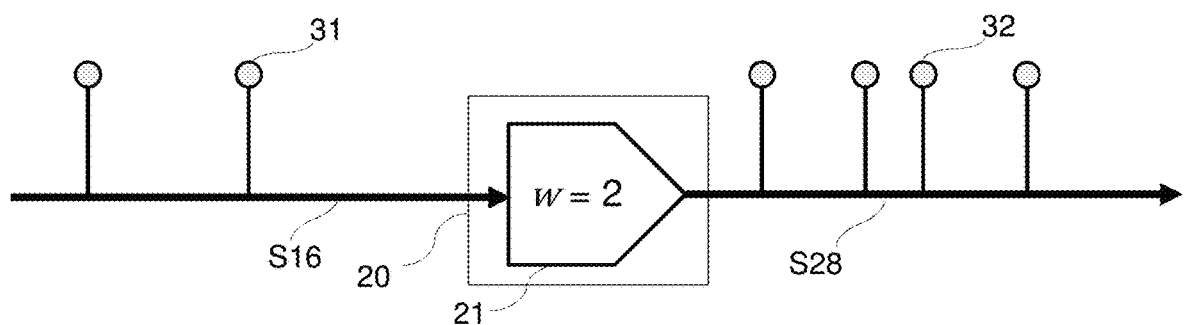
Figure 7C:
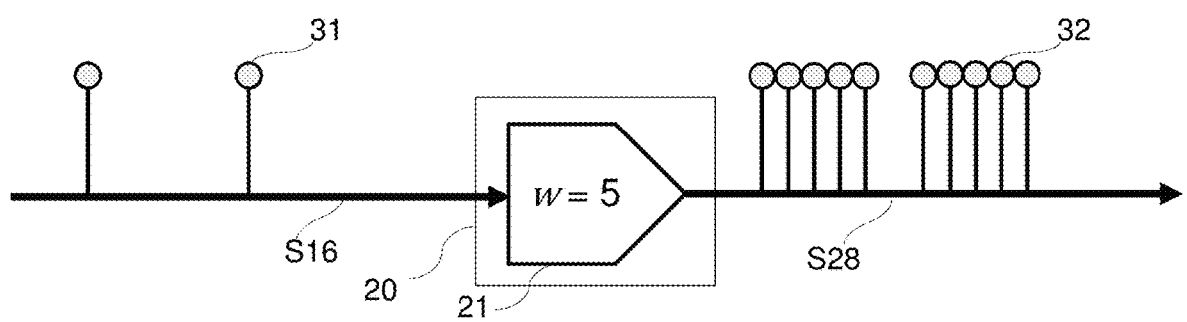
Figure 7D:
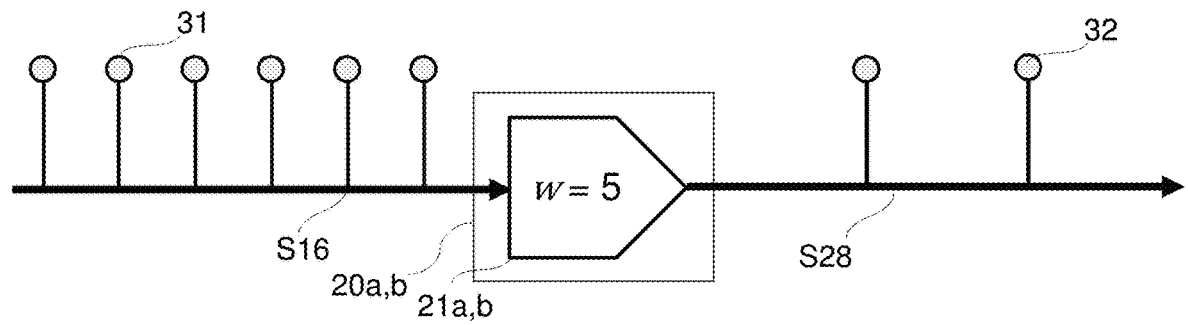

Since the number of spikes emitted S28 by the synaptic unit results from a modulation that depends on the weights stored on the unit 20, 20a-20c, not every spike 31 received S22 may actually cause to generate S27 and transmit S28 spikes 32 to a post-synaptic neuron 14, as illustrated in FIG. 7A. Rather, only some of the received spikes 31 may actually be seen to be converted (modulated), into a larger (or smaller) number of spikes 32, see FIGS. 7B and 7C. Sequence of successive spikes accordingly generated may form spike trains, as best seen in FIG. 7C. Since the modulation is performed in frequency, the spikes 31 received S22 will mostly be converted into a distinct number of spikes. Whether this conversion leads to a larger or smaller number depends both on the weight values and the actual scheme. E.g., a spike train of a larger number of spikes may be obtained, as in embodiments illustrated in FIGS. 3 and 7A-7C, or, conversely, spikes received from the pre-synaptic neuron 11 may be converted into a smaller number of spikes (as in embodiments illustrated in FIGS. 4-6, and 7D). But since the conversion also depends on the weight values, spikes received at step S22 may occasionally lead to the emission S28 of a single post-synaptic spike 31, or no spike at all. In some configurations, more than one spikes 31 may need be received S22 at the synaptic unit to trigger the generation S27 of a post-synaptic spike 32. In such cases, input spikes 31 may, depending on the synaptic weight, not be directly converted into one or more post-synaptic spikes 32.

Figure 1B:
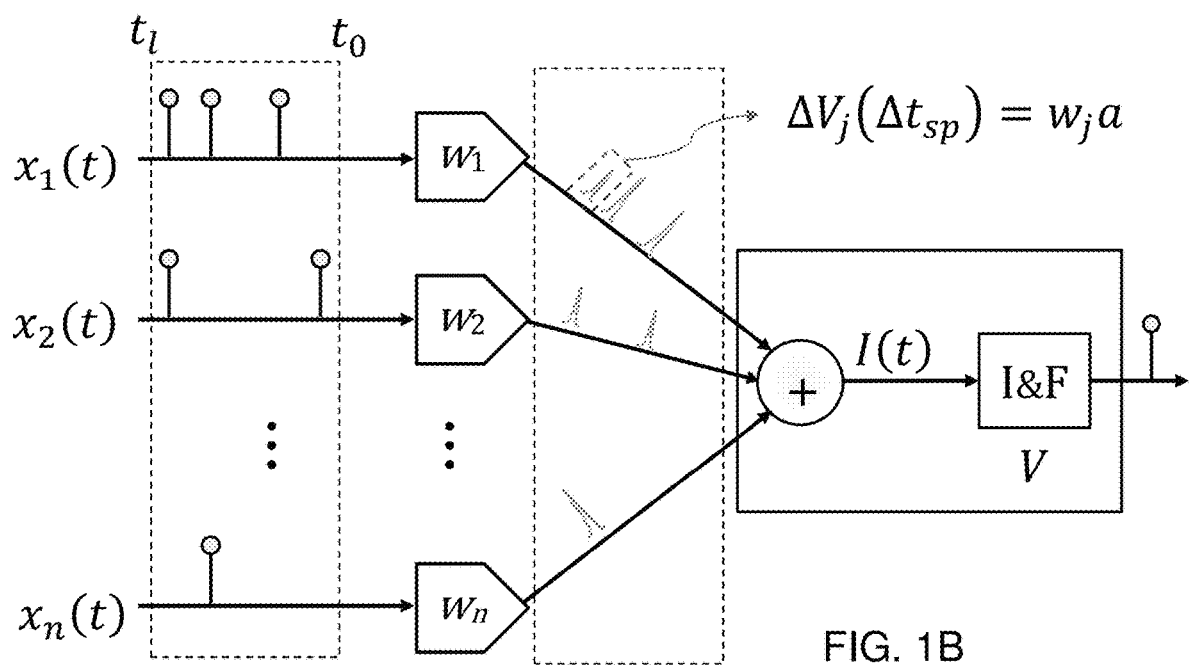
Figure 2B:
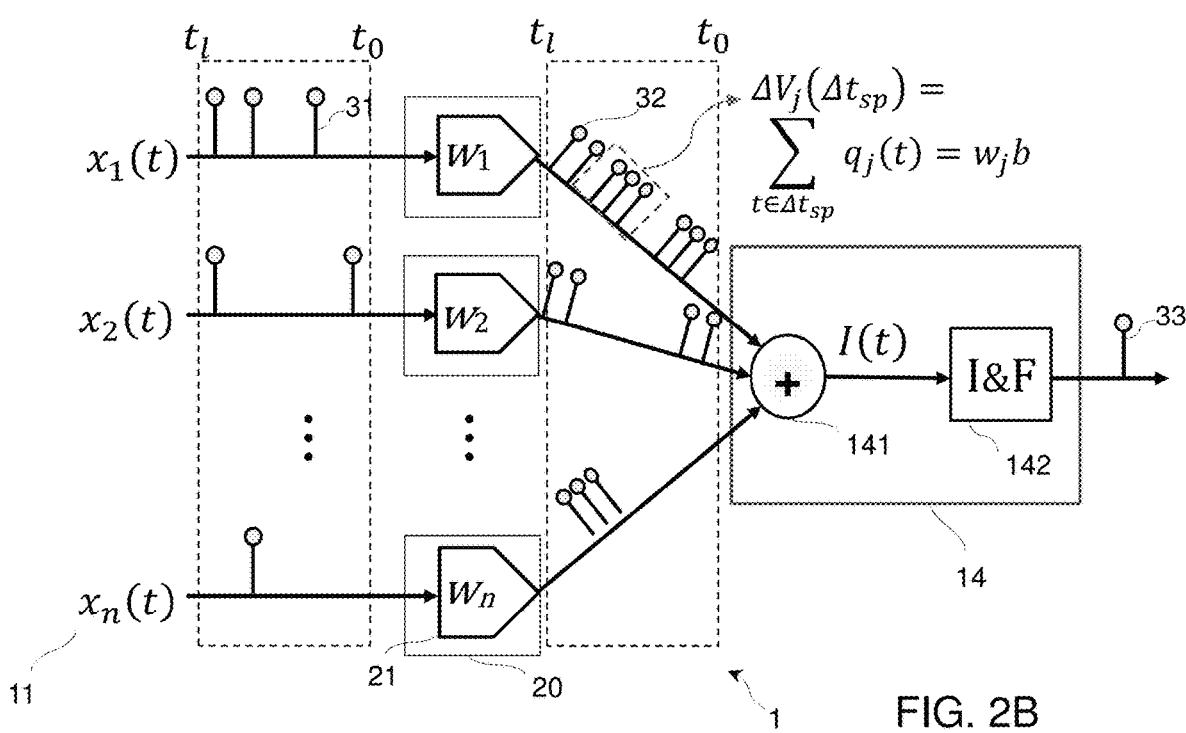

The present approach allows an efficient and reliable neural network implementation, which involves the transmission of discrete events rather than continuous signal values (compare FIGS. 2B and 1B). By definition, the present approach is compatible with digital technology. It is otherwise compatible with a synapse implementation using memristive devices, as in embodiments of the invention discussed later in reference to another aspect of the invention.

The proposed scheme makes it possible to obtain a higher dynamic range in the synapse output, thanks to the fact that the discrete events generated S27 at the synaptic unit can be more discernibly read and integrated at each output neuron 14, compared to analog signals 34 (see FIG. 1). Indeed, in prior art approaches that rely on analog, post-synaptic signals, the amplitudes of such signals need be sufficiently differentiated to allow a satisfactory discrimination between values read from such amplitudes. This, however, limits the dynamic range obtainable for signals in the synapse output. On the contrary, the present approach relies on time resolution to distinguish the post-synaptic events 32. Assuming a sufficiently fast detection mechanism at the output neurons 14, one understands that a higher dynamic range can be obtained in the synapse output. A proviso is that time slots assigned to the generated spikes 32 result in typically larger time frames. The latter may nevertheless be compensated with a satisfactory time resolution on reading. Plus, the post-synaptic current 32 can be integrated in smaller time steps than used for analog signals 34 at the membrane potential in the receiving neuron 14, all things being otherwise equal. Note, the time resolution needed and the dynamic range that can be achieved therewith depend on the target application and the implementation chosen therefor. As an example, assuming that the system runs in a microsecond time and that the spiking synapse are clocked using nanosecond pulses, then the range achieved already outperforms a standard (analog) synapse configuration with an 8-bit dynamic range.

The present scheme has other advantages. For instance, it allows a more efficient selection of a winner neuron in a winner-take-all network. That is, in prior methods, the difference between a membrane potential and the firing threshold is often used to estimate the winner, which is the first neuron to cross the threshold. On the contrary, in embodiments as contemplated herein, the winner neuron can be directly determined through thresholding without the need for additional calculations.

While an ideal analog synapse is hard to implement in practice, the present methods provide solutions to represent the weights in a different manner. Such methods can be applied to native neuromorphic hardware technology and, as such, contribute to offer massive power and efficiency gain in cognitive tasks. Hardware accelerators make it possible to speed up such tasks, in particular in resistive processing units (RPUs) made of a crossbar array of memristors.

All this is now described in detail, in reference to particular embodiments of the invention. To start with, note that the above process accounts for operations as specifically performed at the synaptic unit 20, 20a-20c, be it for inference or training purpose. However, at the level of the apparatus 1, 1a-1, additional operations are being concurrently performed, notably at the circuits implementing the neurons 11, 14. Such operations are included in the flowchart of FIG. 8, whereby an external system may for instance be coupled to the SNN, and thereby transmit signals thereto. Such signals are read S12 as inputs at each receiving neuron, see the phase S10. This, in turn, causes to generate S14 spikes at the pre-synaptic neurons 11, which spikes are subsequently transmitted S16 to synaptic units 20, 20a-20c, for them to implement a process S20 such as described above. Spikes subsequently transmitted by the synaptic units are received S32 at respective post-synaptic neurons 14, causing to generate S34 output spikes and transmit S36 the latter to other pre-synaptic neurons of other layers of the network, and so on.

Thus, in embodiments, the present methods may notably comprise steps implemented at post-synaptic neurons 14, whereby output spikes 33 are generated S34 based on S32 post-synaptic spikes 32 transmitted, as illustrated in FIG. 8. Where several input neurons 11 connect to a same output neuron 14 (see FIG. 2B), spikes output from all adjoining synapses 20 are eventually added 141 to form the total post-synaptic signal (e.g., current) at the receiving neuron 14. The total post-synaptic signal is integrated 142 at the receiving neuron 14, e.g., to generate S34 output spikes 33.

The above process S10-S30 may notably be performed for training purposes, as assumed in the flowchart of FIG. 8. When the training completes S40, final weights are obtained, which can subsequently be used for inference purposes S50. I.e., the final weights can be maintained unchanged at the same network or be passed to another network, for making inferences therewith. Note, the steps S26-S28 described above may equally be performed for inference purposes. In this case too, inputs received from pre-synaptic neurons 11 are modulated S26, thereby generating spikes that are transmitted to post-synaptic neurons 14, so as for the SNN to output signals that are interpreted as results (inferences).

During a training phase, the synaptic weights may for instance be determined thanks to states maintained at the synaptic units. As seen in FIG. 8, each synaptic unit 20, 20a-20c shall thus maintain S25 a state, which determines the synaptic weight w that is used, in turn, to modulate S26 input spikes 31. This state can be altered according to a cognitive learning mechanism, so as to suitably adjust the weights. As evoked earlier, the cognitive mechanism may for example be a STDP mechanism. In variants, this learning mechanism may be any suitable (e.g., global) learning scheme, such as a backpropagation mechanism. In other variants, though, the SNN may simply be designed to implement an inference engine, as noted earlier. I.e., the weights may be set (i.e., programmed) based on weights as learned elsewhere.

Such states can notably be captured by resistance states of device elements forming part of the synaptic unit 20, 20a-20c. E.g., use can notably be made of a memristive devices 21, 21a-21c, see FIGS. 3-6. Such devices can be regarded as electrical resistance switches, which are able to retain a state of internal resistance based on the history of applied voltage and current. Namely, a memristive device is able to retain a state of internal resistance based on previously applied (i.e., the history of) voltages and currents. Such a device can accordingly be used to store and process information. In the present context, the performance characteristics of memristive devices may improve over conventional integrated circuits'.

Learning mechanisms cause to alter S24 states maintained at the synaptic units 20, 20a-20c, based on spikes 31 received S22 from pre-synaptic neurons 11, as well as output spikes 33 generated S34 at post-synaptic neurons 14 of the SNN 1, 1a-1c. Note, a local learning mechanism solely relies on spikes locally emitted by the post-synaptic neuron 14, in addition to spikes received from the pre-synaptic neuron 11, as assumed in FIG. 2. That is, each synaptic connection learns its respective weight based on spikes 31 received from the respective, pre-synaptic neuron 11 and output spikes 33 generated at the respective, post-synaptic neuron 14. For instance, the synaptic units 20, 20a-20c may implement a STDP mechanism, or a STDP-like mechanism, as assumed in the accompanying drawings. Such a mechanism causes each synaptic unit to alter S24 states they maintain based, on the one hand, on spikes 31 received S22 from the respective pre-synaptic neuron 11 and output spikes 33 generated S34 at the corresponding, post-synaptic neuron 14. In variants, a more global learning scheme may be used, which also takes into account output spikes emitted by other neurons.

As illustrated in FIG. 2B, output spikes 33 can be generated S34 by integrating post-synaptic spikes 32 received at post-synaptic neurons 14, based on a count thereof. E.g., at a synaptic element 20, input spikes 31 received from the pre-synaptic neuron 11 can be translated into trains of spikes, all with the same amplitude, where the number of spikes depends on the synaptic weight. As seen in FIG. 2B, at synapse j, an input spike 31 locally translates into a spike train that, in case of an integrate-and-fire (IF) neuron, results in the following contribution to its neuronal membrane potential:

$$\Delta V_j(\Delta t_{sp}) = \Sigma_{t \in \Delta t_{sp}} q_j(t) = w_j b.$$

In the above equation, $\Delta t_{sp}$ stands for the time interval for each input spike, and $q_j(t)$ denotes a spike output at synapse j. All such outputs are of a same amplitude, such that their sum is proportional to the synaptic weight $w_j$ (up to a factor b).

The STDP mechanism is otherwise unchanged. Spikes from all the synapses j that reach a same output neuron 14 are added to form the total post-synaptic current at this receiving neuron 14 and the total post-synaptic current is integrated into the membrane potential at the receiving neuron 14 to generate the output spikes 33. Thus, the total contribution of the post-synaptic current, as integrated into the membrane potential V over a time period ranging from $t_0$ to $t_l$, can be written:

$$\Delta V(t_0, t_l) = \Sigma_{t=t_0}^{t_l} \Sigma_{j=1}^{n} x_j(t) w_j b,$$

where $x_j(t)$ denotes the occurrence of an input spike at synapse j at time instance t (there are n connections leading to the output neuron of interest in this case), $w_j$ is the synaptic weight, and b is a constant.

On the contrary, in prior art solutions (see FIGS. 1A and 1B), each input spike 31 from a pre-synaptic neuron 11 translates to an analog current 34 at the synapse output (post-synaptic current), where the amplitude of the current depends on the synaptic weight. As seen in FIG. 1B, an input spike 31 locally translates into the following contribution to the membrane potential:

$$\Delta V_j(\Delta t_{sp}) = w_j a,$$

where $\Delta t_{sp}$ stands for a time interval for each input spike, $w_j$ is the synaptic weight and a is a constant. The synaptic weight varies according to the activity of the pre- and post-synaptic neurons (e.g., according to a STDP mechanism). The currents from all the synapses are added to form the total post-synaptic current at the receiving neuron and the total post-synaptic current is integrated at the receiving neuron to generate output spikes. Thus, in this case, the total contribution of the post-synaptic current, as integrated over a time period ranging from $t_0$ to $t_l$, can be written:

$$\Delta V(t_0, t_l) = \Delta_{t=t_0}^{t_l} \Sigma_{j=1}^{n} x_j(t) w_j a.$$

Figure 3:
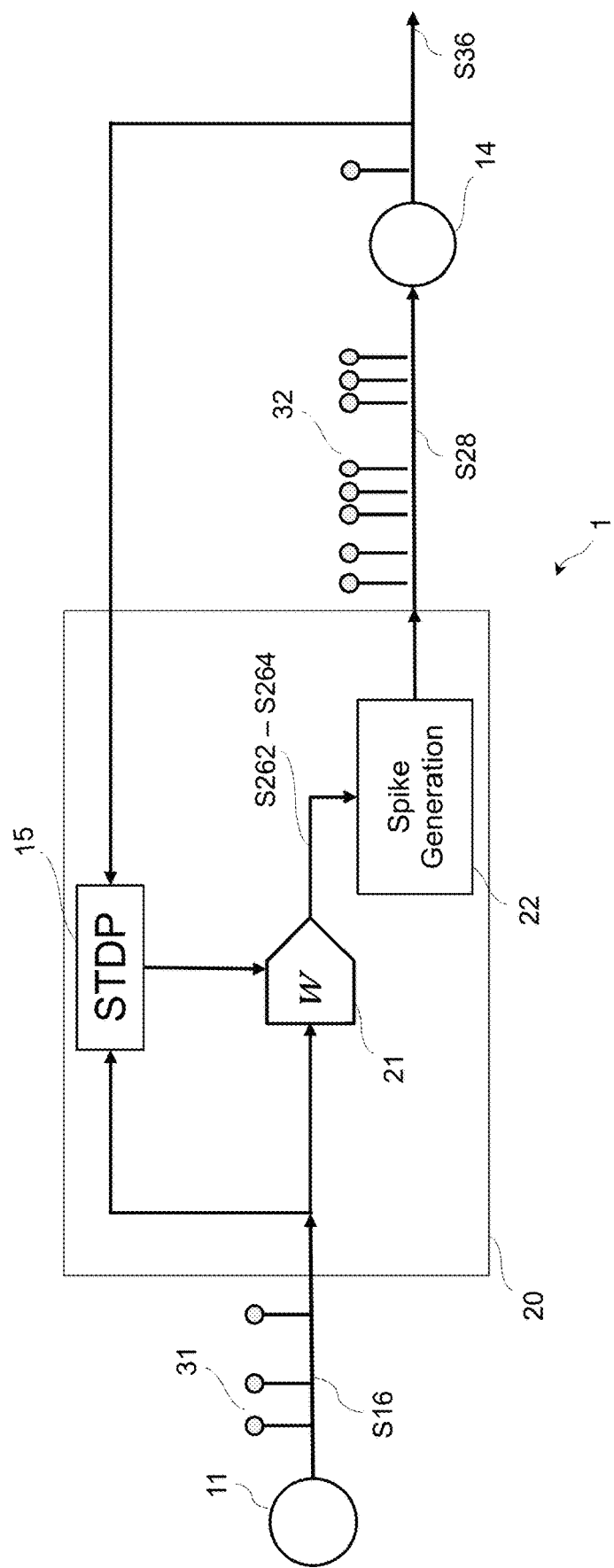

A first class of embodiments is now described in reference to FIG. 3. In this example, spikes 31 received S22 from the pre-synaptic neuron 11 are modulated S26 (at each synaptic unit 20), by first converting S262 the spikes 31 received into electrical current, thanks to a memristive device 21. Note, more generally, such spikes may first be converted into electrical signals (voltage signals may be relied on). In all cases, the modulation depends on the current synaptic weight w, itself determined by the current state of the synapse 20. Then, the frequency of the post-synaptic spikes 32 to be generated is set S264, based on said electrical signals, and prior to generating the spikes 32 thanks to a spike generation unit 22.

In the specific example of FIG. 3, the device depicted forms part of a hardware apparatus 1 and includes a memristive device 21 that stores the synaptic weight w, a circuit block 15 that implements the desired learning rule, as well as a spike generation block 22 that generates spikes (in predefined intervals) with a spike frequency that depends on the current synaptic weight w. The spike generation unit 22 can for instance be adapted from neuronal circuit implementations such as described in the references cited in the background section. The operation of the synaptic element shown in FIG. 3 is as follows. The input spikes 31 received from the pre-synaptic neuron 11 generates read events at the memristive element 21. The resulting read current sets the post-synaptic spike frequency at the spike generation block 22, based on which the post-synaptic spikes are generated S27. The synaptic weight w is concomitantly updated using a given learning rule, e.g., STDP-based.

Figure 4:
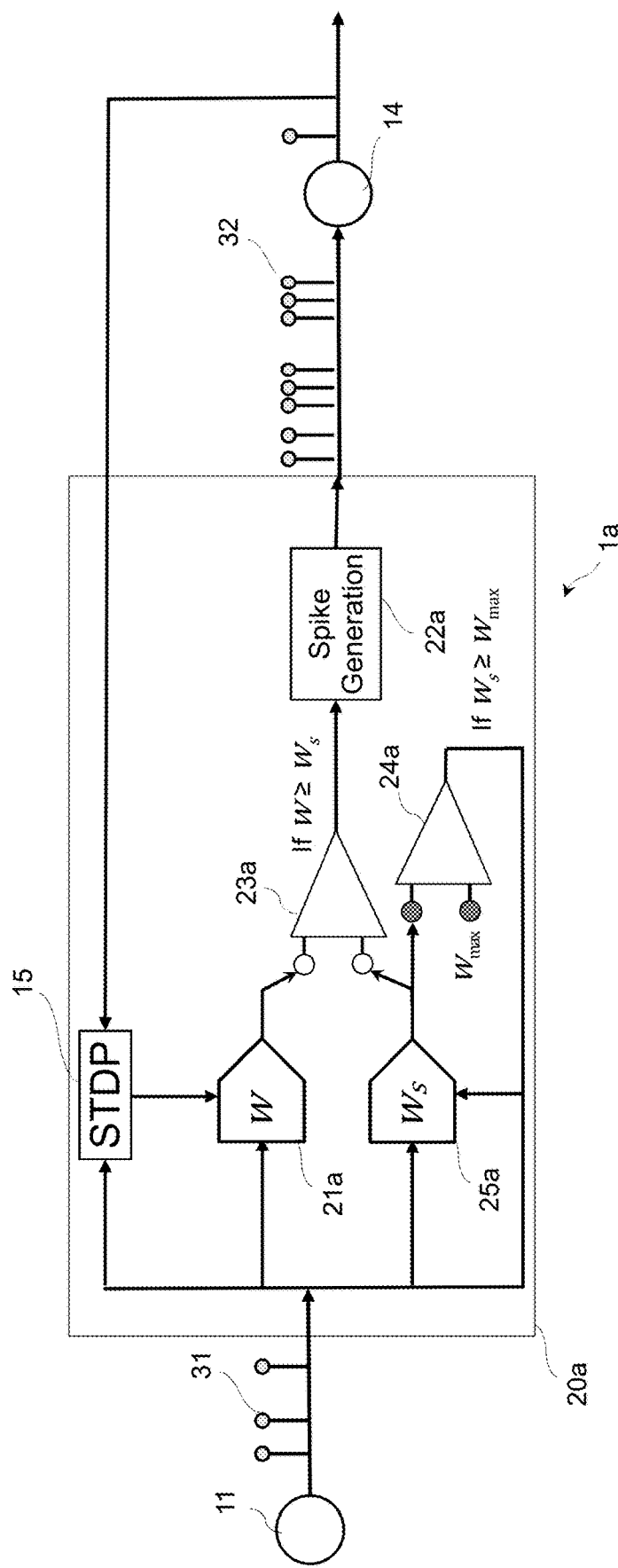
Figure 5:
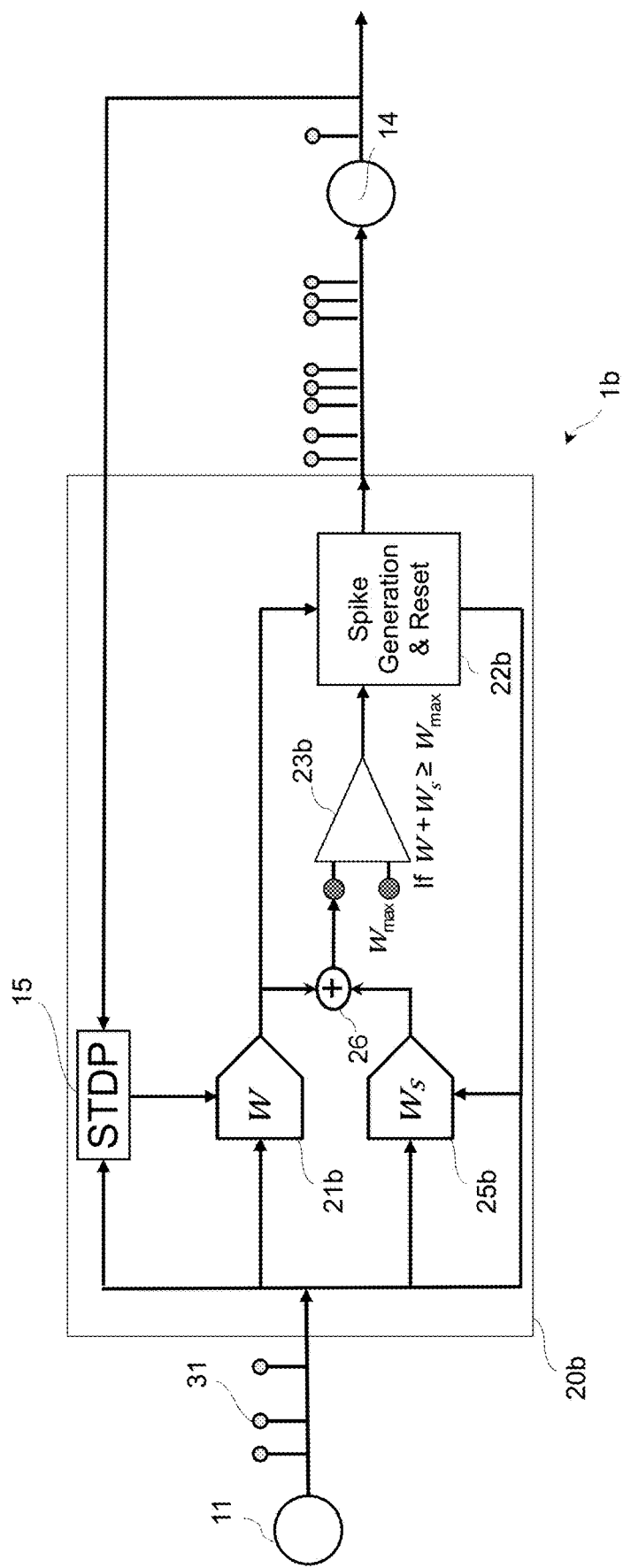

A similar process is involved in FIGS. 4 and 5, with the following provisos. FIGS. 4 and 5 reflect two additional classes of embodiments, which requires the synaptic units to maintain S25, each, an additional state (call it a secondary state). That is, the primary state determines the weight w, while the secondary state maintained S25 at a synapse determines a short-term synaptic weight $w_s$. As seen in FIGS. 4 and 5, the latter also depends on spikes 31 received from the pre-synaptic neuron 11. More in detail, spikes 31 received S22 from the pre-synaptic neuron 11 are now modulated S26 by comparing 23a, 23b the current synaptic weight w to a threshold value. The latter depends on the short-term synaptic weight $w_s$. The post-synaptic spikes 32 are generated S27 only if the current synaptic weight w is larger than or equal to said threshold value.

Comparators 23a, 23b are involved to that aim. The above comparison amounts to evaluating a conditional construct for a current synaptic weight w with respect to said threshold value. This value can be defined in different ways. In particular, the threshold value may be taken to be equal to the short-term synaptic weight $w_s$ or as the difference $w_{max}-w_s$, where $w_{max}$ is a maximal value allowed for the sum $w+w_s$.

In more detail, in embodiments such as depicted in FIG. 4, the threshold value is taken to be equal to the short-term synaptic weight $w_s$, such that the current synaptic weight w is compared 23a to $w_s$ and post-synaptic spikes 32 are generated S27 only if the current synaptic weight w happens to be larger than or equal to $w_s$. The modulation and generation process S26-S27 includes a comparison 24a between $w_s$ and the maximal value $w_{max}$ allowed for $w_s$. Next, if $w_s$ is found to be larger than or equal to said maximal value, the short-term weight $w_s$ is reset to its initial value, i.e., a parameter that may possibly be adjusted to any value between 0 and $w_{max}$.

In the specific example of FIG. 4, the device depicted forms part of a hardware apparatus 1a, which comprises a memristive device 21a, storing the synaptic weight w, a short-memory memristive device 25a that determines the number of post-synaptic spikes on modulation, as well as two comparators blocks 23a, 24a. As in FIG. 3, the circuit block 15 implements the learning rule. However, the spike generation block 22a now generates spikes depending on the output of the comparator block 23a. The operation of the synaptic element depicted is as follows. Inputs are accumulated to the short-memory device 25a (storing $w_s$) using a write pulse for each incoming spike. Incoming spikes generate read events to both memristive elements 21a, 25a. An output spike is generated only if $w \geq w_s$, while the short-memory memristive device 25a is reset if $w_s \geq w_{max}$. Meanwhile, the synaptic weight w is updated using a given learning rule. Thus, when the synaptic weight w is small, after a few incoming events the condition $w \geq w_s$ will not be valid and the synapse 20a will stop firing. On the contrary, when the synaptic weight w is high, the condition $w \geq w_s$ remains valid for several incoming events.

In embodiments such as illustrated in FIG. 5, the threshold value is instead taken as the difference $w_{max}-w_s$ between a maximal value $w_{max}$ and the short-term synaptic weight $w_s$. Note, said maximal value is now a maximal value allowed for the sum $w+w_s$. Thus, the current weight w is now compared 23b to the difference $w_{max}-w_s$, and post-synaptic spikes 32 are generated S27 only if the current synaptic weight w is larger than or equal to this difference. The short-term synaptic weight $w_s$ is here reset 22b every time that a post-synaptic spike 32 is generated S27 for transmission to the post-synaptic neuron 14, i.e., after having generated S27 this spike.

In the specific example of FIG. 5, the device depicted forms part of a hardware apparatus 1b and comprises components 15, 21b, 22b, and 25b, similar to components 15, 21a, 22a, and 25a of FIG. 4. However, this element does not include a second comparator. Instead, an adder block 26 adds signals obtained from the memristive elements 21b, 25b and the spike generation block generates spikes depending on the output of the comparator block 23b. This element is operated as follows. Inputs accumulate to the short-memory device 25b, using a write pulse for each incoming spike 31. Still, incoming spikes 31 generate read events at both elements 21b, 25b. An output spike is generated if $w+w_s \geq w_{max}$. In variants, the synapse 20b may generate multiple spikes (in a predefined interval) with a spike frequency that depends on the synaptic weight. The short-memory device 25b is reset after each output fire event in that case. The synaptic weight w is concurrently updated by the circuit block 15. When the synaptic weight w is low, several incoming events (that also increase the weight $w_s$) are needed for the sum $w+w_s$ to reach $w_{max}$. On the contrary, when the synaptic weight w is already high, the sum $w+w_s$ can more easily reach $w_{max}$, possibly thanks to a single incoming event.

FIG. 6 reflects a further class of embodiments, where each input spike triggers oscillations, via a voltage-controlled oscillator 28. Here the frequency or damping of the oscillator circuit is controlled by the weight w as stored on the memristor device 21c. A large weight value leads to a high frequency or a low damping, whereas a small weight value leads to a low frequency or a high damping. I.e., the weight of the memristor device 21c is used to determine a spiking threshold for the unit 29c. When the voltage exceeds a threshold value $V_{th}$, a single spike is generated.

Referring to FIGS. 2A, 3-6, another aspect of the invention is now described in detail, which relates to synaptic unit circuits 20, 20a-20c for transmitting signals between neurons 11, 14 of a hardware-implemented SNN 1, 1a-1c. The components and operation of such circuits have already been described in reference to the present methods. The main characteristics of these circuits are thus only briefly described in the following. Such a synaptic circuit is generally designed to connect a pre-synaptic neuron 11 to a post-synaptic neuron 14 of the network, so as to form a neuronal connection. When suitably connected to a pre-synaptic neuron 11 and a post-synaptic neuron 14, this circuit allows spikes 31 received from the pre-synaptic neuron 11 to be modulated, in frequency, based on the synaptic weight w stored thereon, so as to generate a post-synaptic spike 32. That is, spikes 31 received from the pre-synaptic neuron 11 can be translated into a distinct number of post-synaptic spikes 32, prior to transmitting the post-synaptic spikes 32 generated to the post-synaptic neuron 14, in operation.

As said, such a circuit can be configured so as to generate post-synaptic spikes 32 that have all a same amplitude. In addition, the circuit may for instance maintain a state that determines said synaptic weight w and alter said state based, on the one hand, on spikes 31 received from said pre-synaptic neuron 11 and, on the other hand, on spikes 33 emitted by the post-synaptic neuron 14 it attaches to, in operation.

As seen in FIGS. 3-5, the circuit can include a spike generation unit 22, 22a-22c, wherein this unit is designed to generate post-synaptic spikes 32 and transmit the post-synaptic spikes 32 accordingly generated to a post-synaptic neuron 14, in operation. An update unit 15 typically forms part of the circuit. This unit 15 is arranged such as to be connectable to the pair of neurons 11, 14. The unit 15 serves to alter the state of the circuit (e.g., based on a STDP mechanism), to thereby allow the weight to be learned, in operation. Moreover, the circuit may comprise a memristive device 21, 21a-21c, wherein the latter is connected to each of the spike generation unit and the update unit 15. The memristive device is connected to the spike generation unit 22, 22a-22c; it is otherwise connectable to a pre-synaptic neuron 11. As explained earlier, the memristive device 21, 21a-21c is adapted to retain a resistive state, so as for the spike generation unit 22, 22a-22c to modulate spikes 31 received by the memristive device from the pre-synaptic neuron 11 based on a synaptic weight w as determined from this state, and subsequently generate post-synaptic spikes 32, in operation. The memristive device is furthermore connected to the update unit 15: any state of the memristive device (as altered by the update unit 15) determines (a change to) the synaptic weight w, which itself impacts the modulation of the spikes 31, in operation.

As illustrated in FIG. 3, the memristive device 21, 21a, 21b may notably be configured to convert spikes 31 into electrical current, in an extent determined by the synaptic weight w, itself determined by the state retained by the memristive device. Complementarily, the spike generation unit 22, 22a-22c may be designed to set the frequency of the post-synaptic spikes 32, based on such electrical current, to modulate spikes 31 received from the pre-synaptic neuron 11, in operation.

The present Inventors have performed a number of experiments to check the validity of the present approach. In particular, they have tested and confirmed the possibility for detecting correlations with a neuron connected by several input streams, this neuron being otherwise connected to a synaptic unit circuit as described above. As they concluded, such a spiking synaptic element makes it unambiguously possible to determine whether some of the input data streams are statistically correlated.

Referring to FIGS. 4, 5, such a synaptic unit circuit 20a, 20b may further be configured to retain distinct states, i.e., a primary state and a secondary state. The primary state is retained by the first memristive device 21a, 21b, while a second memristive device 25a, 25b is provided (again, connectable to a pre-synaptic neuron 11) to retain the secondary state. The latter determines the short-term synaptic weight $w_s$. As described earlier, the secondary state depends on spikes 31 received by the second memristive device from the pre-synaptic neuron 11, in operation.

As further seen in FIGS. 4, 5, the synaptic unit circuit 20a, 20b may further comprise a comparator 23a, 23b. The latter is connected to each of the first memristive device 21a, 21b and the second memristive device 25a, 25b, so as to be able to compare a current synaptic weight w to a threshold value. As explained earlier, the threshold value may be defined in various ways. In all cases, this threshold value depends on the short-term synaptic weight $w_s$, itself determined from the secondary state. The post-synaptic spikes 32 are generated by the spike generation unit 22a, 22b only if the current synaptic weight w is larger than or equal to said threshold value, in operation.

As described earlier, this threshold value may simply be set equal to the short-term synaptic weight $w_s$ (see FIG. 4), in which case a second comparator 24a is included to compare said short-term synaptic weight $w_s$ to the maximal value $w_{max}$ allowed for the threshold value. The circuit is otherwise configured to reset the short-term synaptic weight $w_s$ if the latter is found to be larger than or equal to said maximal value, thanks to the second comparator 24a.

In variants as illustrated in FIG. 5, a single comparator 23b is relied on, which is designed to use the difference $w_{max}-w_s$ as said threshold value for comparison purposes. There, post-synaptic spikes 32 are generated by the spike generation unit only if the current synaptic weight w is found to be larger than or equal to the above difference $w_{max}-w_s$, in operation. The circuit resets the short-term synaptic weight $w_s$ every time a post-synaptic spike 32 is generated for transmission to the post-synaptic neuron 14 (after having generated this spike).

Next, according to a final aspect, the invention can be embodied as a hardware apparatus 1, 1a-1c. This apparatus implements a SNN and comprises a number of neuronal connections. Each of these connections includes a pre-synaptic neuron 11, a post-synaptic neuron 14, and a synaptic unit circuit 20, 20a-20c such as described earlier. Each synaptic unit circuit respectively connects a pre-synaptic neuron 11 to a post-synaptic neuron 14. Each post-synaptic neuron may notably be connected by a plurality of synaptic unit circuits of the network, as shown in FIG. 2B. Each post-synaptic neuron 14 may thus be configured to generate output spikes 33 based on post-synaptic spikes 32 transmitted by each of the respective synaptic unit circuits 20, 20a-20c. As explained earlier in detail, each post-synaptic neuron 14 may further configured to generate output spikes 33 by integrating post-synaptic spikes 32 transmitted by the respective circuits 20, 20a-20c, based on a count of the transmitted spikes 32.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method for transmitting signals between neurons of a hardware-implemented spiking neural network, wherein the latter comprises neuronal connections, each including a synaptic unit connecting a pre-synaptic neuron to a post-synaptic neuron, the method comprising, for each neuronal connection of said neuronal connections and at each synaptic unit thereof:

modulating, in frequency, spikes received from the pre-synaptic neuron of said each neuronal connection based on a synaptic weight stored on said each synaptic unit, to generate post-synaptic spikes, whereby a first number of spikes received from the pre-synaptic neuron are translated into a second number of post-synaptic spikes; and transmitting the post-synaptic spikes generated to the post-synaptic neuron of said each neuronal connection.

2. The method according to claim 1, wherein the method further comprises:

at the post-synaptic neuron of said each neuronal connection, generating output spikes based on the post-synaptic spikes transmitted.

3. The method according to claim 2, wherein the method further comprises:

at said each synaptic unit, maintaining a state that determines said synaptic weight, wherein said state can be altered according to a cognitive learning mechanism.

4. The method according to claim 3, wherein the method further comprises:

altering, at said each synaptic unit, said state according to said cognitive learning mechanism, based, on the one hand, on spikes received from said pre-synaptic neuron and, on the other hand, output spikes generated at one or more post-synaptic neurons of the spiking neural network.

5. The method according to claim 4, wherein:
said synaptic unit is configured to implement a spike-timing-dependent plasticity mechanism based on spikes received from said pre-synaptic neuron and output spikes generated at said post-synaptic neuron, whereby said state is altered based on this spike-timing-dependent plasticity mechanism.

6. The method according to claim 2, wherein:
said output spikes are generated by integrating post-synaptic spikes as received at said post-synaptic neuron, based on a count thereof.

7. The method according to claim 2, wherein:
the spikes received from the pre-synaptic neuron are modulated, at said each synaptic unit, by first converting the spikes received into one or more electrical signals, according to a synaptic weight determined by said state, and then by setting a frequency of the post-synaptic spikes to be generated, based on said electrical signals.

8. The method according to claim 2, wherein:
said state is a primary state; and
modulating spikes received from the pre-synaptic neuron comprises:
  maintaining a secondary state that determines a short-term synaptic weight, based on spikes received from the pre-synaptic neuron; and
  comparing a current synaptic weight as determined by said primary state to a threshold value, which depends on said short-term synaptic weight as determined from said secondary state, whereby said post-synaptic spikes are generated only if the current synaptic weight is larger than or equal to said threshold value.

9. The method according to claim 8, wherein:
said threshold value is equal to said short-term synaptic weight, whereby the current synaptic weight is compared to said short-term synaptic weight and said post-synaptic spikes are generated only if the current synaptic weight is larger than or equal to said short-term synaptic weight; and
modulating spikes received from the pre-synaptic neuron further comprises comparing said short-term synaptic weight to a maximal value allowed for said threshold value and, if said value is accordingly found to be larger than or equal to said maximal value, resetting said short-term synaptic weight.

10. The method according to claim 8, wherein:
said threshold value is equal to a difference between a maximal value and said short-term synaptic weight, whereby the current synaptic weight is compared to said difference, said maximal value being a maximal value allowed for the sum of the current synaptic weight and said short-term synaptic weight, such that said post-synaptic spikes are generated only if the current synaptic weight is larger than or equal to said difference; and
modulating spikes received from the pre-synaptic neuron further comprises resetting said short-term synaptic weight every time that a post-synaptic spike is generated for transmission to said post-synaptic neuron, after having generated this spike.

11. The method according to claim 1, wherein:
the post-synaptic spikes generated have all a same signal amplitude.

12. A synaptic unit circuit for transmitting signals between neurons of a hardware-implemented spiking neural network, wherein:
the circuit is designed to connect a pre-synaptic neuron to a post-synaptic neuron of the network, so as to form a neuronal connection; and
the circuit is configured, when connected to said pre-synaptic neuron and said post-synaptic neuron, to:
  modulate, in frequency, spikes received from the pre-synaptic neuron based on a synaptic weight stored on the circuit, to generate post-synaptic spikes, whereby a first number of spikes received from the pre-synaptic neuron are translated into a second number of post-synaptic spikes, in operation; and
  transmit the post-synaptic spikes generated to the post-synaptic neuron.

13. The synaptic unit circuit according to claim 12, wherein:
the circuit is further configured, when connected to said pre-synaptic neuron and said post-synaptic neuron, to generate post-synaptic spikes that have all a same amplitude.

14. The synaptic unit circuit according to claim 12, wherein:
the circuit is further configured, when connected to said pre-synaptic neuron and said post-synaptic neuron, to maintain a state that determines said synaptic weight and alter said state based, on the one hand, on spikes received from said pre-synaptic neuron and, on the other hand, on spikes emitted by said post-synaptic neuron.

15. The synaptic unit circuit according to claim 14, wherein the circuit comprises:
a spike generation unit designed to generate said post-synaptic spikes and transmit the post-synaptic spikes generated to the post-synaptic neuron, in operation;
an update unit, connectable to each of said pre-synaptic neuron and post-synaptic neuron, and configured to alter said state, in operation; and
a memristive device, wherein the latter is:
  connected to the spike generation unit and otherwise connectable to said pre-synaptic neuron, the memristive device configured to retain said state, so as for the spike generation unit to modulate spikes received by the memristive device from the pre-synaptic neuron based on a synaptic weight determined from said state, and generate said post-synaptic spikes, in operation; and,
  connected to said update unit, whereby any state altered by the update unit determines the synaptic weight used to modulate the spikes, in operation.

16. The synaptic unit circuit according to claim 15, wherein:
said update unit is further configured to implement a spike-timing-dependent plasticity mechanism based on spikes received from said pre-synaptic neuron and output spikes generated at said post-synaptic neuron, whereby said state is altered based on this spike-timing-dependent plasticity mechanism, in operation.

17. The synaptic unit circuit according to claim 15, wherein:
- the memristive device is further configured to convert spikes received from the pre-synaptic neuron into one or more electrical signals, according to a synaptic weight determined by the state retained in the memristive device; and
- the spike generation unit is further configured to set a frequency of the post-synaptic spikes to be generated, based on said electrical signals, so as to modulate spikes received from the pre-synaptic neuron, in operation.

18. The synaptic unit circuit according to claim 15, wherein:
- said state is a primary state and said memristive device is a first memristive device, configured to retain said primary state; and
- the synaptic unit circuit further comprises a second memristive device, which is connectable to said pre-synaptic neuron and designed to retain a secondary state that determines a short-term synaptic weight, said secondary state depending on spikes received by the second memristive device from the pre-synaptic neuron, in operation.

19. The synaptic unit circuit according to claim 16, wherein:
- the synaptic unit circuit further comprises a comparator, the latter connected to each of the first memristive device and the second memristive device, so as to compare a current synaptic weight as determined from said primary state to a threshold value, the latter depending on said short-term synaptic weight as determined from said secondary state, whereby said post-synaptic spikes are generated by the spike generation unit only if the current synaptic weight is larger than or equal to said threshold value, in operation.

20. The synaptic unit circuit according to claim 19, wherein:
- said comparator is a first comparator, which is designed to use said short-term synaptic weight as said threshold value, whereby said post-synaptic spikes are generated by the spike generation unit only if the current synaptic weight is larger than or equal to said short-term synaptic weight; and
- the circuit further includes a second comparator that is configured to compare said short-term synaptic weight to a maximal value allowed for said threshold value, the circuit being otherwise configured to reset the short-term synaptic weight if the latter is found to be larger than or equal to said maximal value.

21. The synaptic unit circuit according to claim 19, wherein:
- said comparator is designed to use a difference between a maximal value and said short-term synaptic weight as said threshold value, for comparing the current synaptic weight to said threshold value, wherein said maximal value is a maximal value allowed for the sum of the current synaptic weight and said short-term synaptic weight, whereby said post-synaptic spikes are generated by the spike generation unit only if the current synaptic weight is larger than or equal to said difference, in operation; and
- the circuit is further configured to reset the short-term synaptic weight every time that a post-synaptic spike is generated for transmission to the post-synaptic neuron, after having generated this spike.

22. A hardware apparatus implementing a spiking neural network, wherein:
- the network comprises a number of neuronal connections, each including:
  - a pre-synaptic neuron;
  - a post-synaptic neuron; and
  - a synaptic unit circuit, which respectively connects said pre-synaptic neuron to said post-synaptic neuron;
  - the synaptic unit circuit configured for transmitting signals between neurons of a hardware-implemented spiking neural network, wherein:
- the circuit is designed to connect the pre-synaptic neuron to the post-synaptic neuron of the network, so as to form the neuronal connection; and
- the circuit is configured, when connected to said pre-synaptic neuron and said post-synaptic neuron, to:
  - modulate, in frequency, spikes received from the pre-synaptic neuron based on a synaptic weight stored on the circuit, to generate post-synaptic spikes, whereby a first number of spikes received from the pre-synaptic neuron are translated into a second number of post-synaptic spikes, in operation; and
  - transmit the post-synaptic spikes generated to the post-synaptic neuron.

23. The hardware apparatus according to claim 22, wherein:
- each post-synaptic neuron of said neuronal connections is:
  - connected by a plurality of synaptic unit circuits of the network; and
  - configured to generate output spikes based on the post-synaptic spikes transmitted by a one or more respective synaptic unit circuits.

24. A hardware apparatus according to claim 23, wherein:
said each post-synaptic neuron is further configured to generate said output spikes by integrating the post-synaptic spikes transmitted by the respective synaptic unit circuits based on a count thereof.

* * * * *